United States Patent
Peloux (10) Patent No.: US 11,960,157 B2
(45) Date of Patent: Apr. 16, 2024

(54) VARIABLE OPTICAL TRANSMISSION DEVICE AND ASSOCIATED CONTROL METHOD

(71) Applicant: Essilor International, Charenton-le-Pont (FR)

(72) Inventor: Marius Peloux, Charenton-le-Pont (FR)

(73) Assignee: Essilor International, Charenton-le-Pont (FR)

( * ) Notice: Subject to any disclaimer, the term of this patent is extended or adjusted under 35 U.S.C. 154(b) by 932 days.

(21) Appl. No.: 16/964,490

(22) PCT Filed: Feb. 5, 2019

(86) PCT No.: PCT/EP2019/052812
§ 371 (c)(1),
(2) Date: Jul. 23, 2020

(87) PCT Pub. No.: WO2019/154821
PCT Pub. Date: Aug. 15, 2019

(65) Prior Publication Data
US 2021/0033891 A1 Feb. 4, 2021

(30) Foreign Application Priority Data

Feb. 6, 2018 (EP) ..................................... 18305120

(51) Int. Cl.
*G02F 1/133* (2006.01)
*G02C 7/10* (2006.01)
*G02C 11/00* (2006.01)

(52) U.S. Cl.
CPC ......... *G02F 1/13318* (2013.01); *G02C 7/101* (2013.01); *G02C 11/10* (2013.01)

(58) Field of Classification Search
CPC .. G02F 1/13318; G02F 1/13306; G02F 1/163; G02F 1/29; G02C 7/101; G02C 11/10; G02C 7/102
See application file for complete search history.

(56) References Cited

U.S. PATENT DOCUMENTS

| 4,279,474 A | 7/1981 | Belgorod |
| 5,276,539 A | 1/1994 | Humphrey |
(Continued)

FOREIGN PATENT DOCUMENTS

| DE | 10 2014 014 544 A1 | 3/2016 |
| EP | 3 072 011 A1 | 9/2016 |
(Continued)

OTHER PUBLICATIONS

European Office Action dated May 5, 2022 in European Patent Application No. 18305120.0, 5 pages.

(Continued)

*Primary Examiner* — Tony Ko
(74) *Attorney, Agent, or Firm* — Oblon, McClelland, Maier & Neustadt, L.L.P.

(57) ABSTRACT

A variable optical transmission device (2) comprising: —ariable transmission optics (4a, 4b) capable of varying an optical transmission between an initial transmission value ($T_V(t_i)$) and a target transmission value ($T_V^{target}$), and —a control unit (5) configured to control a transmission parameter of the variable transmission optics, wherein the control unit (5) is configured to control a response duration of the variable transmission optics as a function of the initial transmission value ($T_V(t_i)$) and the target transmission value ($T_V^{target}$).

14 Claims, 3 Drawing Sheets

(56) References Cited

U.S. PATENT DOCUMENTS

| | | | |
|---|---|---|---|
| 5,671,035 A * | 9/1997 | Barnes | G02C 7/101 |
| | | | 351/158 |
| 2002/0044112 A1 | 4/2002 | Gross et al. | |
| 2015/0286073 A1 | 10/2015 | Blum | |
| 2017/0351118 A1 | 12/2017 | Barrau et al. | |
| 2018/0210233 A1 | 7/2018 | Cano et al. | |
| 2018/0210236 A1 | 7/2018 | Peloux et al. | |

FOREIGN PATENT DOCUMENTS

| | | |
|---|---|---|
| WO | WO 92/10130 A1 | 6/1992 |
| WO | WO 2014/071179 A2 | 5/2014 |
| WO | WO 2015/077097 A1 | 5/2015 |
| WO | WO 2017/009535 A1 | 1/2017 |
| WO | WO 2017/009544 A1 | 1/2017 |
| WO | WO 2017/104466 A1 | 6/2017 |

OTHER PUBLICATIONS

Extended European Search Report dated Aug. 20, 2018 in European Patent Application No. 18305120.0, 9 pages.
International Search Report and Written Opinion dated Mar. 25, 2019 in PCT/EP2019/052812 filed on Feb. 5, 2019.

* cited by examiner

VARIABLE OPTICAL TRANSMISSION DEVICE AND ASSOCIATED CONTROL METHOD

FIELD OF THE INVENTION

The present invention relates to variable transmission optics.

BACKGROUND OF THE INVENTION

In variable transmission optics, the optical transmission may be automatically varied as a function of the luminous environment of the wearer or on demand.

Variable transmission optics may be used in ophthalmic lenses, sunglasses, ski helmets or even in building windows, doors or walls. In the case of ophthalmic lenses, sunglasses, ski helmets or building windows, the optical transmission may be automatically varied as a function of the luminous environment or on demand. In the case of doors or walls, the optical transmission may be decreased on demand to provide some privacy to the persons in the room.

Variable transmission optics may comprise electrochromic components, liquid crystals or photochromic components, for example.

It is well known that the response duration of variable transmission lenses has an influence on the comfort of the wearer. When the optical transmission of the lenses varies too slowly, when using photochromic lenses for example, the wearer is still indisposed by the change of luminosity of its environment. To the contrary, when the optical transmission of the lenses varies too quickly, when using liquid crystal lenses for example, the change in luminosity experienced by the wearer is too abrupt, also resulting in discomfort.

In photochromic lenses, the response duration depends on the composition and concentration of the photochromic components and may not be adapted to the wearer's preferences. In electrochromic and liquid crystal lenses, the response duration is automatically set by the control unit of the lenses and may also not correspond to the wearer's preferences.

There is thus a need to improve the comfort of wearers of variable transmission lenses or more generally of users of variable transmission optics and to improve the adaptability of the response duration to the wearer's preferences.

Presentation of the Invention

In view of the above, one aim of the invention is to alleviate at least part of the inconveniences of the prior art.

In particular, one aim of the invention is to improve the comfort of wearers of variable transmission optics.

Another aim of the invention is to improve the adaptability of the response duration to the wearer's preferences. To this end, it is proposed, according to a first aspect, a variable optical transmission device comprising:
- a variable transmission optics capable of varying an optical transmission between an initial transmission value and a target transmission value, and
- a control unit configured to control a transmission parameter of the variable transmission optics, wherein the control unit is configured to control a response duration of the variable transmission optics as a function of the initial transmission value and the target transmission value.

In embodiments, the variable transmission device may further comprise one or a combination of the following features:
- the response duration is chosen according to preferences of the wearer or of a group of wearers,
- the control unit is configured to control the response duration depending on the sign of a difference between the initial transmission value and the target transmission value, wherein the control unit is configured to control
  - a first response duration for lowering an optical transmission of the variable transmission optics from an initial transmission value to a target transmission value, and
  - a second response duration for increasing the optical transmission from the initial transmission value to the target transmission value,
- the first response duration being different from the second response duration,
- the variable optical transmission device it further comprises an ambient light sensor configured to measure periodically the illuminance and to detect a change in illuminance, wherein:
  - the change in illuminance is detected when the illuminance measured is different from a reference illuminance during a predetermined temporization duration,
  - the control unit is configured to control, upon detection of the change of illuminance after the predetermined temporization duration, a transmission parameter of the variable transmission optics, and
  - the response duration comprises the predetermined temporization duration.
- the predetermined temporization is defined as a function of the initial and the target transmission value,
- the reference illuminance comprises a first reference illuminance and a second reference illuminance, and the predetermined temporization duration comprises a first temporization duration and a second temporization duration, the change in illuminance being detected when the illuminance measured is greater than a first reference during a first temporization duration and when the illuminance measured is less than the second reference illuminance during a second temporization duration,
- the first temporization duration is different from the second temporization duration,
- the first temporization duration and the second temporization duration are dependent of a sign of a difference between the initial and the target transmission value,
- the variable transmission device further comprises:
  - a remote configuring unit configured to send to the control unit:
    - at least a first response duration and a second response duration, the configuring unit being intended to be used for testing different first response duration, second response duration on a wearer of the variable transmission device or for configuring the variable transmission device with a first response duration and a second response duration according to preferences of the wearer.

According to an embodiment, the variable transmission optics is chosen between one of an electrochromic optics and a liquid crystal optics, and the transmission parameter of the variable transmission optics is an optical transmission of the variable transmission optics.

According to that embodiment, the variable transmission device may further comprise one or a combination of the following features:

the control unit is configured to control the optical transmission value such that the optical transmission value varies according to:

$$\tau_V(t_i+t) = \tau_V(t_i) + f_{\tau_V(t_i),\tau_{V,target}}(t),$$

wherein $T_V(t_i)$ is the initial transmission value at a time $t=t_i$,
$\tau_V(t_i+)$ is the current transmission value at a time $t_i+t$, and
$f\tau_V(t_i), \tau_{V,target}(t)$ is a transition function depending on the initial transmission value $\tau_V(t_i)$ and the target transmission value $\tau_{V,target}$ defined such that:

$$\begin{cases} f_{\tau_V(t_i),\tau_{V,target}}(0) = 0 \\ \lim_{t \to +\infty} f_{\tau_V(t_i),\tau_{V,target}}(t) = \tau_{V,target} - \tau_V(t_i) \end{cases}$$

in the absence of a detection of a change of illuminance after $t=t_i$,
Further, the transition function has a total transition duration defined by the time interval during which the transition function reaches a transmission value of 0.95 $(\tau_{V,target} - \tau_V(t_i))$, and the response duration comprises the total transition duration,
the total transition duration is chosen greater than or equal to 300 milliseconds and lower than or equal to 10 500 milliseconds,
the total transition duration is defined as a function of the initial transmission value and the target transmission value,
when the optical transmission lowers from a first initial transmission value to a first target transmission value, the optical transmission varies according to a first transition function having a first total transition duration $\Delta t_{trans,Dn}$, when the optical transmission increases from a second initial transmission value to a second target transmission value, the optical transmission varies according to a second transition function having a second total transition duration $\Delta t_{trans,B1}$, and
the second total transition duration is different from the first total transition duration,
$0.2 < \Delta t_{trans,Dn} / \Delta t_{trans,B1} < 0.8$,
when the optical transmission lowers from a first initial transmission value to a first target transmission value, the optical transmission varies according to a first transition function having a first total transition duration,
when the optical transmission increases from a second initial transmission value to a second target transmission value, the optical transmission varies according to a second transition function having a second total transition duration, and when the first initial transmission value is equal to the second target transmission value and the first target transmission value is equal to the second initial transmission value,
the second total transition duration is different from the first total transition duration.

According to another embodiment, the variable transmission optics is a photochromic optics, the variable transmission device further comprises a transparent heating element, the control unit is configured to control the response duration of the photochromic optics by setting a predetermined temperature during a predetermined heating duration, the predetermined temperature and heating duration are determined as a function of the initial transmission value and the target transmission value.

It is also proposed, according to a second aspect, a method for controlling the transmission of a variable transmission device comprising:
controlling a transmission parameter of a variable transmission optics of said variable transmission device, wherein the method further comprises:
controlling a response duration of the variable transmission optics as a function of an initial transmission value and a target transmission value.
In embodiments, the method may further comprise one or a combination of the following features:
the response duration is chosen according to preferences of the wearer,
the method comprises:
controlling the response duration depending on a sign of a difference between the initial transmission value and the target transmission value, comprising:
controlling a first response duration for lowering an optical transmission of the variable transmission optics from an initial transmission value to a target transmission value, and
controlling a second response duration for increasing the optical transmission from an initial transmission value to a target transmission value,
the first response duration being different from the second response duration,
the method comprises:
measuring periodically the illuminance using an ambient light sensor,
detecting a change in the measured illuminance when the measured illuminance is different from a reference illuminance during a predetermined temporization duration,
controlling, upon detection of the change in illuminance after the predetermined temporization duration, a transmission parameter of the variable transmission optics
the method comprises:
measuring periodically the illuminance using an ambient light sensor,
detecting a change of illuminance when the illuminance measured is greater than a predefined range during a first temporization duration and when the illuminance measured is less than a predefined range during a second temporization duration, the first temporization duration being different from the second temporization duration, and
the control unit controls, upon detection of the change of illuminance, a transmission parameter of the variable transmission optics,
It is also proposed, according to a third aspect, a computer program, for example a non-transitory computer program, comprising one or more stored sequence/s of instructions that is accessible to a processor and which, when executed by the processor, causes the processor to carry out the steps of the method previously described.
It is also proposed a storage medium, for example a non-transitory storage medium, storing said computer program previously described.

BRIEF DESCRIPTION OF THE DRAWINGS

Further details, aspects and embodiments of the proposed solution will be described, by way of example only, with reference to the drawings.

DETAILED DESCRIPTION

Figure 1:
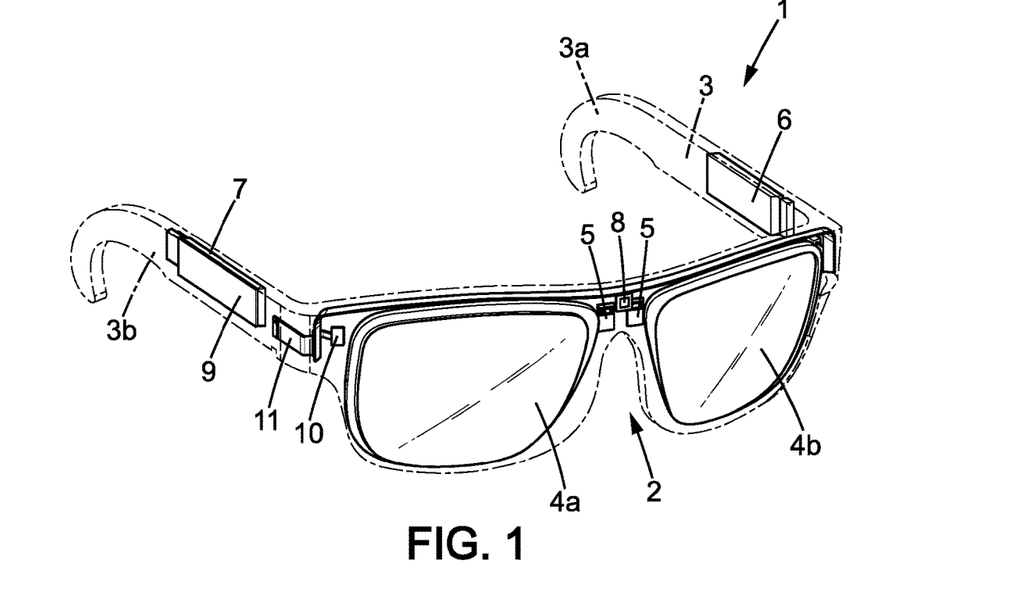
FIG. 1 represents an eyewear comprising a variable transmission device according to an embodiment.

FIG. 1 represents a system, here an eyewear 1, comprising a variable transmission device 2 and a frame 3. The variable transmission device 2 comprises two variable transmission optics 4a, 4b, here ophthalmic lenses, and at least a control unit 5. In the embodiment described here, the variable transmission optics may be an electrochromic lens or a liquid crystal lens. Each of the variable transmission optics 4a, 4b is controlled by a control unit 5 configured to control a transmission parameter of the variable transmission optics, here the optical transmission of the electrochromic lens or of the liquid crystal lens.

The system, i.e. the eyewear 1, may comprise an ambient light sensor 8, for example placed on the frame 3 between the two ophthalmic lenses 4a, 4b. The ambient light sensor 8 may be configured to detect a change in illuminance in the exterior environment and/or transmit a measured illuminance to the control unit 5. The variable transmission device 2 is thus controlled in an "automatic mode".

Optionally, the variable transmission device 2 may comprise a control element 9 which may be used to switch between the automatic mode and a manual mode. In the manual mode, the user can indicate, using a graphical user interface, a control configuration to be used comprising the target value of transmission to be reached by the variable transmission optics 4a, 4b and parameters that may be used to set a particular response duration for reaching the target value of transmission. The control element 9 may be a tactile slider, a switch having different positions or a smartphone, for example.

An electrochromic lens (or more generally optics) comprises two transparent layers, for example two plates made of organic or mineral glass, on which at least two electrodes are placed. The internal surface of the two transparent layers defines a cell which is filled with an electrochromic mixture comprising electrochromic compounds. The electrochromic compounds have the particularity of changing reversibly their colour when a voltage is applied due to oxidation and reduction reactions. Thus, by applying an electrical field between the at least two electrodes, the optical transmission of the cell and thus of the optics may be varied. The electrodes should transmit enough visible light for the wearer to see through the lens in the absence of darkening.

A liquid crystal lens (or more generally optics) has a similar structure and comprises two transparent layers on which electrodes are deposited. The cell defined by the internal surface of the transparent layers is filled with a liquid crystal structure. When an electrical field is applied on the electrodes, the liquid crystals change their orientation and thus modify the path of the light crossing the liquid crystal cell. The intensity of the light crossing the liquid crystal lens or optics may thus be varied by applying different voltages on the electrodes. The electrodes should transmit enough visible light for the wearer to see through the lens in the absence of darkening. Different types of liquid crystal optics may be considered. For example, nematic liquid crystals placed between two crossed polarizers may be considered. Guest host liquid crystals may also be considered. Guest hosts liquid crystals comprise nematic liquid crystals associated to dichroic dyes. When an electrical field is applied between the two electrodes, the dichroic dies orientate in the same direction as the nematic liquid crystals and the global transmission of the liquid crystal optics is dependent of the applied electrical field. Guest host liquid crystals thus present transmission values greater than 50% because of the absence of crossed polarizers.

It is thus possible to control the optical transmission of electrochromic or liquid crystal lenses or optics by applying a different voltage function of the electrodes of the electrochromic or liquid crystal cells.

In order to control the optical transmission of the electrochromic or liquid crystal lens or optics, the system also comprises a voltage driver 7 configured to receive a command signal from the control unit 5 and to output a voltage signal intended to be applied to the electrodes of the variable transmission optics.

The system also comprises an electrical energy source, for example a battery 6 mounted on branch 3a of the frame 3 as represented in FIG. 1. The battery supplies the control unit 5 and other electrical components such as the sensor 8, the control element 9 and/or the voltage driver 7.

The system may also comprise a visualizing unit 10, for example a light-emitting diode (LED), which may inform the wearer of eyewear of a malfunction, for example when the battery is empty or when the ambient light sensor is not functioning properly.

The system may also comprise a closure detecting element 11 positioned on one of the branches of the frame 3, for example branch 3b. The closure detecting element is configured to detect when the branch 3b is being opened or closed and to communicate with the control unit 5 to switch on or off the control unit 5. The closure detecting element 11 may for example be a magnetoresistance effect element associated to a magnet positioned on the frame between the branch 3b and the variable transmission optics 4a.

Figure 2:
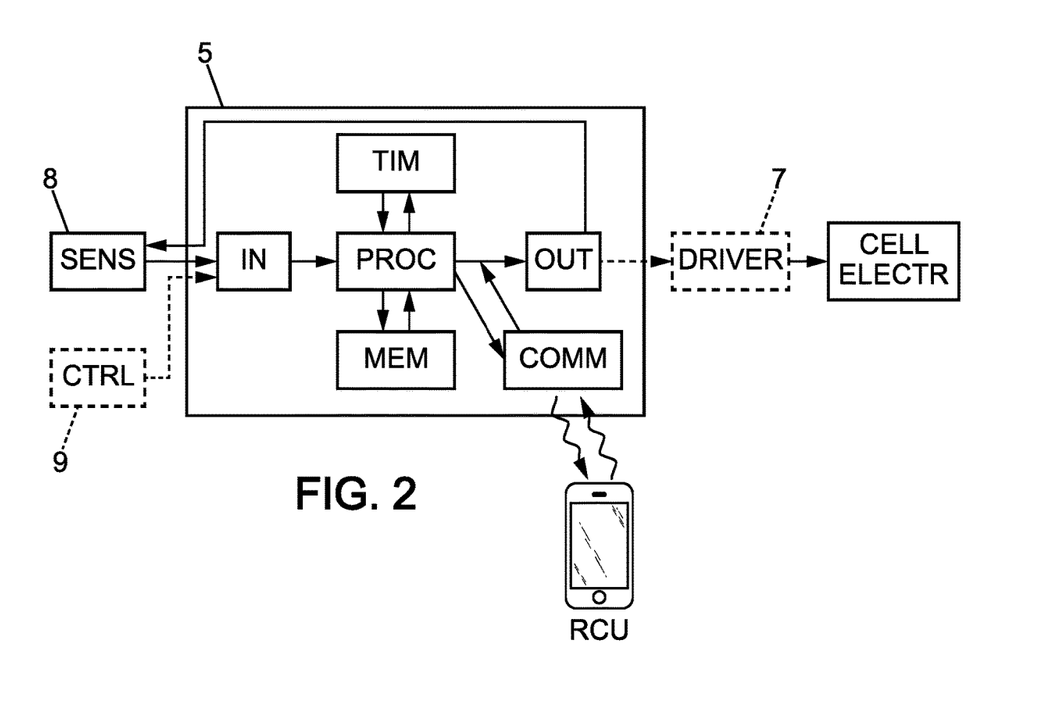
FIG. 2 represents a control unit according to an embodiment.

FIG. 2 represents the control unit 5 according to an embodiment in which the variable transmission device 2 is operated in automatic mode. The control unit 5 may comprise a processor PROC, a clock TIM, a memory MEM, input and output interfaces IN and OUT respectively and a communication interface COMM. The input interface IN receives signals sent by the ambient light sensor 8 and transmits them to the processor PROC. The processor PROC, depending on the input data received from signals sent by the ambient light sensor 8, computes one or more command signals representative of transmission values of the variable transmission optics that are intended to be transmitted to the voltage driver 7 via the output interface OUT. The voltage driver 7 generates a corresponding voltage signal that is applied to the electrodes of the electrochromic or liquid crystal cells CELL ELECTR comprised within the electrochromic or liquid crystal lenses 4a, 4b. The processor PROC may also configure the sensor via the output interface OUT. In order to compute the command signals, the processor PROC retrieves instructions from the memory MEM. The memory MEM may also contain different variables that are used by the processor PROC when calculating the different command signals. The processor PROC may also save or update some variables in the memory MEM when necessary.

The clock TIM is used to clock the processor PROC and is a time reference for the sending and receiving of the different signals. The voltage driver 7 and the sensor 8 may be integrated in the control unit 5. The communication interface COMM is configured to establish a communication between the processor PROC and a remote configuring unit RCU.

The remote configuring unit RCU communicates with the processor PROC of the control unit 5 to configure the control unit 5. The remote configuring unit RCU may be for example a smartphone comprising a dedicated application for configuring the control unit. In particular, the configuring unit may update or load instructions to be executed by the processor PROC and/or various variables or parameters that may be saved on the memory MEM. The remote configuring unit RCU may communicate with the control unit 5 via the communication interface using the Bluetooth™ protocol.

The remote configuring unit RCU may also be used to test different parameters on a user of the variable transmission device in order to adapt the response duration of the variable transmission lens or optics to its preferences. In particular, the remote configuring unit RCU may be used to test different response durations depending on whether the transmission of the variable transmission device is being lowered or increased or depending on the initial and target transmission values.

Optionally, the variable transmission device 2 comprises a control element 9 which may be used by the user to switch between an automatic and a manual mode. The control element 9 may also be used to select a particular control configuration comprising the value of target transmission to be reached and parameters that may be used to set a particular response duration for reaching the target value of transmission. According to the invention, the control unit is configured to control the response duration which is determined as a function of the target transmission value and of the initial transmission value. Thus, different response durations may be used depending on the target transmission value to be reached and on the initial transmission value of the variable transmission optics. The response duration may also be chosen depending on whether the optical transmission is being lowered or increased to reach the target transmission value.

The response duration of the variable transmission optics is controlled by the control unit. The response duration corresponds to the time interval during which the optical transmission varies from an initial transmission value to a target transmission value in response to a change in the luminous environment when the variable transmission optics is controlled in automatic mode or in response to an activation of the control element, when the variable transmission optics is controlled in manual mode. The target transmission value corresponds to the stationary value of transmission that is reached by the optics at the end of the response duration.

In the case of an electrochromic or liquid crystal optics, the target transmission value may be chosen as a function of the current illuminance measured by the ambient light sensor.

The response duration may be controlled in different ways, which are illustrated in the remaining of the description.

The variable transmission device 2 may for example be operated in automatic mode. In automatic mode, the ambient light sensor 8 measures periodically the illuminance of the exterior environment and indicates when a change in illuminance in the exterior environment occurs. The ambient light sensor 8 may also provide an indication of the currently measured illuminance. The value of the currently measured illuminance may be used by the processor PROC of the control unit 5 to calculate the target transmission value. The processor PROC then generates one or more command signals for varying the optical transmission between the initial transmission value and the target transmission value which are sent to the voltage driver 7. The voltage driver 7 generates a corresponding voltage signal that is applied to the command electrodes of the electrochromic or liquid crystal lenses 4a, 4b. The voltage signal may be a Pulse Width Modulation (PWM) signal in which the duty cycle may be varied to control the optical transmission of the liquid crystal lens or optics, for example. The optical transmission may also be varied by applying a voltage signal whose amplitude corresponds to a predetermined optical transmission of the electrochromic or liquid crystal lens or optics or by applying a voltage signal having a varying frequency, for example.

Figure 3:
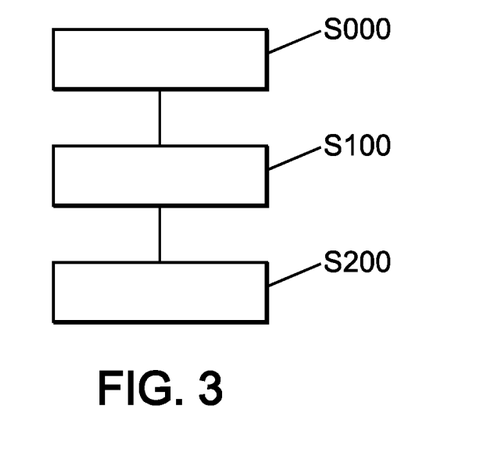
FIG. 3 represents a method for controlling a variable transmission device in automatic mode that may be carried out by the control unit according to an embodiment.

FIG. 3 represents a method for controlling a variable transmission device comprising electrochromic or liquid crystal optics in automatic mode according to an embodiment. The method described here enables to control the response duration of the variable optical transmission device.

The method comprises an initialization step S000, a step S100 of detecting of a change in the illuminance and a step S200 of controlling the optical transmission of the variable optical transmission device.

The initialization step S000 comprises loading into the memory MEM of the control unit 5 instructions and parameters intended to be used by the processor PROC to compute command signals to control the response duration and the optical transmission. In addition, the initialization step S000 comprises measuring the current illuminance and setting a first transmission value by sending a command signal representative of the transmission value to be reached.

During step S100, the ambient light sensor 8 measures periodically the illuminance and detects whether a change in illuminance has occurred. If the ambient light sensor 8 has detected a change in illuminance, the ambient light sensor indicates to the control unit that a change in illuminance has occurred and transmits the currently measured illuminance to the processor PROC of the control unit which initiates step S200.

In step S200, the processor PROC calculates, using the currently measured illuminance, the target transmission value of the variable optical transmission device. The processor PROC then generates one or more command signals for controlling a transmission parameter of the variable optical transmission device.

The response duration may be varied in different ways.

In step S100, a temporization $\Delta t_{tempo}$ may be applied before the sensor 8 indicates a change in illuminance to the processor PROC of the control unit 5. In that case, a change in illuminance is detected when the illuminance measured is different from a reference illuminance during a predetermined temporization duration $\Delta t_{tempo}$.

In step S200, a transition function having a predetermined duration may be used for varying the optical transmission between the initial transmission value and the target transmission value. The optical transmission value at a given time t is determined according to:

$$\tau_V(t_i+t)=\tau_V(t_i)+f_{\tau_V(t_i),\tau_{V,target}}(t), \quad (1)$$

wherein $\tau_V(t_i)$ is the initial transmission value at a time $t=t_i$, corresponding in the automatic mode to the transmission value of the variable optical transmission optics when the change of illuminance is detected, $\tau_V(t_i+t)$ is the current transmission value at a time $t_i+t$, and $f_{\tau_V(t_i),\tau_{V,target}}(t)$ is a transition function depending on the initial transmission value $\tau_V(t_i)$ and the target transmission value $\tau_{V,target}$ defined such that:

$$\begin{cases} f_{\tau_V(t_i),\tau_{V,target}}(0) = 0 \\ \lim_{t \to +\infty} f_{\tau_V(t_i),\tau_{V,target}}(t) = \tau_{V,target} - \tau_V(t_i) \end{cases}$$

in the absence of a detection of a change of illuminance after $t=t_i$.

The transition function has a total transition duration $\Delta t_{trans}$ defined by the time interval during which the transition function reaches a transmission value of $0.95(\tau_{V,target}-\tau_V(t_i))$.

Thus, the response duration comprises a temporization duration and/or a duration of the transition function, called total transition duration, in the case of electrochromic or liquid crystal lenses.

The method will be described in the case of a variable optical transmission device as described in reference to FIGS. 1 and 2, according to an embodiment further illustrated in reference to FIGS. 3A, 3B, 3C.

Figure 3A:
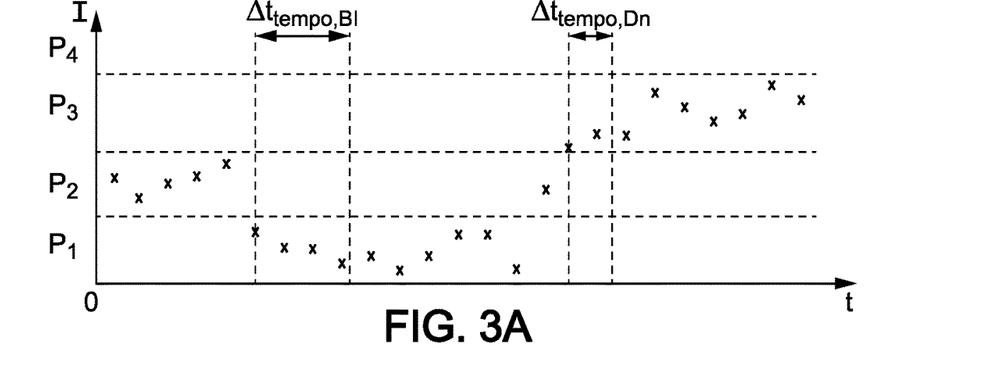
FIG. 3A illustrates an example of illuminance measured by a sensor.
Figure 3B:
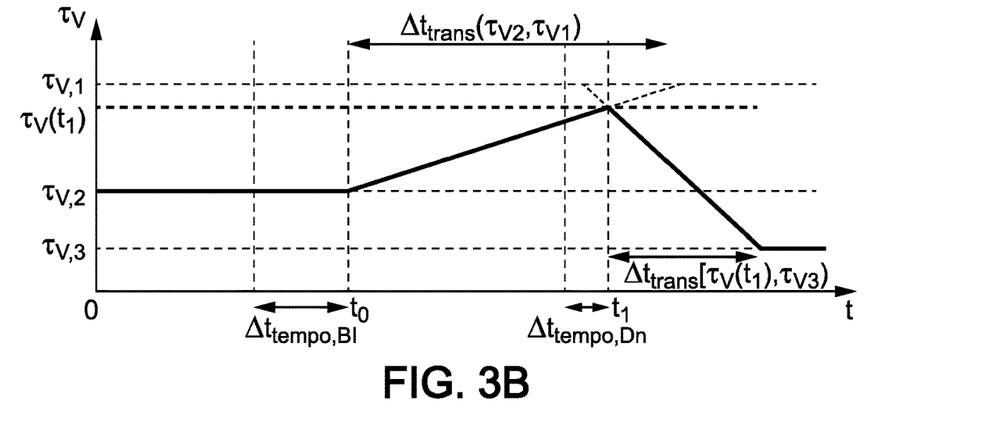
FIG. 3B represents schematically the transmission values of the variable transmission device as controlled by the control unit, according to one embodiment.
Figure 3C:
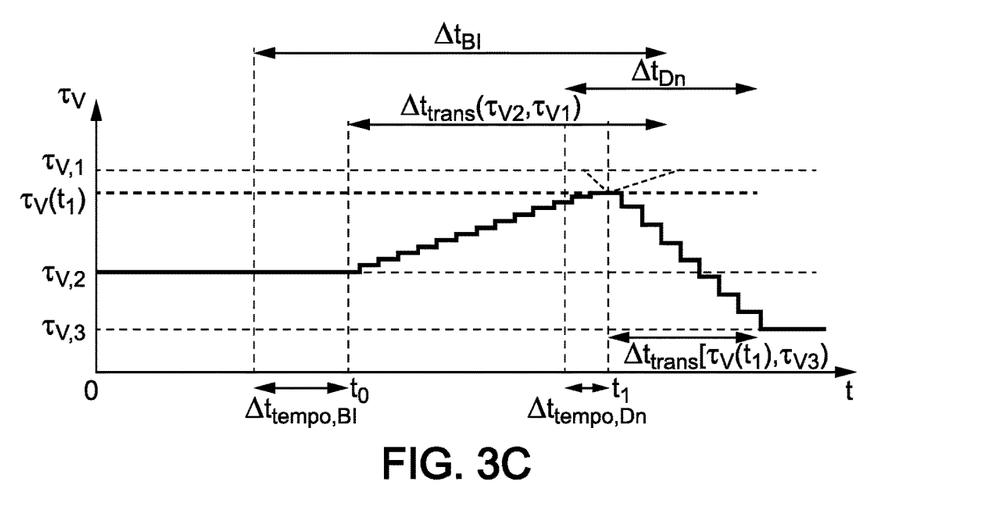
FIG. 3C illustrates the transmission values sent by the command signals of the control unit, according to one embodiment.

FIGS. 3A, 3B and 3C illustrate an embodiment in which the change in illuminance is detected for different illumination ranges P1, P2, P3, . . . , Pn with two different temporization durations $\Delta t_{tempo,B1}$ and $\Delta t_{tempo,Dn}$. In this embodiment, the optical transmission values vary between the initial transmission value and the target transmission value according to a transition function having a total transition duration depending on the initial transmission values and the target transmission values considered. For illustration purposes, the transition function is represented as a linear transition function. Other forms of transition functions may be considered as will be described later.

FIG. 3A represents an example of illuminance measured by an ambient light sensor 8. FIG. 3B represents schematically the transmission values of the variable transmission device as controlled by the control unit and FIG. 3C illustrates an example of the transmission values sent by the command signals of the control unit to the voltage converter.

In this embodiment, the control unit 5 may define a plurality of illuminance ranges, for example four illuminance ranges P1, P2, P3, P4 which are stored in the memory MEM of the control unit 5. Each illuminance range comprises a minimal and a maximal illuminance value Imin,1, Imax,1; Imin,2, Imax,2; Imin,3, Imax,3, respectively. The illuminance ranges may be adjacent to each other i.e. Imax,1=Imin,2, max,2=Imin,3, Imax,3=Imin,4 as represented in FIG. 3A or may partly overlap as further described in WO 2017/009544. For clarity issues, illuminance ranges that are adjacent to each other are further considered here but the same reasoning may apply for overlapping ranges. In that embodiment, the transmission value is determined as a function of the illuminance range corresponding to the measured illuminance when the change in illuminance is detected.

In particular, in the embodiment described here, the following parameters may be used:

For the illuminance range P1: [Imin,1; Imax,1]=[0; 1000 lx] and $\tau v,1$=0.9.

For the illuminance range P2, [Imin,2; Imax,2]=[1000 lx; 3000 lx] and $\tau v,2$=0.55.

For the illuminance range P3, [Imin,3; Imax,3]=[3000 lx; 10000 lx] and $\tau v,3$=0.25.

For the illuminance range P4, [Imin,4=10000 lx; Imax,4] and $\tau v,4$=0.1.

$\Delta t_{tempo,B1}$=1.6 s and $\Delta t_{tempo,Dn}$=1.2 s.

The values defining the illuminance range may be adapted to the conditions of use. By associating to each illuminance range a single target transmission value, the electrical consumption of the variable transmission optics may be decreased. In an alternative, the target transmission value may be determined as a function of the currently measured illuminance transmitted by the sensor to the processor.

The method for controlling the electrochromic or the liquid crystal optics is as follows.

During the initialization phase S000, an initial illuminance value is measured and transmitted to the processor PROC of the control unit 5 via the input interface IN. The processor PROC determines an illuminance range for which the initial illuminance value is comprised between the minimum and maximum illuminance values of one of the predefined illuminance ranges. The corresponding minimum and maximum illuminance values of the current illuminance range are then sent to a memory of the sensor 8. The processor of the control unit 5 also sends the values of the first and second temporization durations $\Delta t_{tempo,Dn}$ and $\Delta t_{tempo,B1}$ via the output interface OUT of the control unit 5.

During step S100, the sensor 8, which also comprises an integrated microprocessor, measures periodically the illuminance in order to detect a change of illuminance when the currently measured illuminance is greater than a maximum illuminance value of current illumination range during the first temporization duration $\Delta t_{tempo,Dn}$ or when the currently measured illuminance is less than a minimum illuminance value of the current illumination range during the second temporization duration $\Delta t_{tempo,B1}$. When a change of illuminance is detected, the value of the currently, measured illuminance, i.e. the last measured illuminance, is sent to the processor PROC of the control unit 5 via the input interface IN.

During step S200, the processor determines which illuminance range corresponds to the measured illuminance and determines the target transmission value corresponding to that illuminance range. The processor then generates one or more command signals for varying the optical transmission between the initial transmission value before detection of the change of illuminance and the target transmission value, the transmission value varying according to (1), wherein the transition function is a linear transition function. The processor sends to the sensor 8 the updated values of the minimum and maximum illuminance of the actual illuminance range and the sensor measures periodically the illuminance as described in step S100 until another change of illuminance is detected.

FIG. 3A shows an example of illuminance which is periodically measured by the ambient light sensor 8. The illuminance is first comprised within range P2 and is then lowered to be comprised within range P1 and further increases to be within range P3. Initially, the transmission value of the variable transmission lens is set to have a value of $\tau v,2$ because the measured illuminance value is within range P2 as can be seen in FIG. 3B.

The sensor 8 detects a first change in illuminance when the measured illuminance is lower than Imin,2 for a time interval that is greater than the second temporization duration $\Delta t_{tempo,B1}$ between $t_0=t_0-\Delta t_{tempo,B1}$ and $t=t_0$. The sensor 8 then sends the illuminance value measured at $t=t_0$, for example, which is within the illuminance range P1 to the processor of the control unit 5. The processor generates one or more command signals for varying the transmission between τv,2 and τv,1 according to a linear transition function having a total transition duration $\Delta t_{trans}[\tau v2,\tau v1]$ which are sent to the voltage driver 7. The processor also sends a signal comprising the minimum and maximum illuminance values Imin,1, Imax,1 of the illuminance range P1 to the sensor 8 via the input interface IN.

The sensor 8 then detects a second change in illuminance when the measured illuminance is greater than Imax,1 for a time interval that is greater than the first temporization duration $\Delta t_{tempo,Dn}$ between $t=t1-\Delta t_{tempo,Dn}$ and $t=t1$. The sensor 8 then sends the currently measured illuminance value measured at $t=t1$, for example, which is within the illuminance range P3 to the processor of the control unit 5. The processor generates one or more command signals for varying the transmission between τv(t1) and τv,3 according to a linear transition function having a total transition duration $\Delta t_{trans}[\tau v(t1),\tau v3]$ which is sent to the voltage driver 7. The processor also sends a signal comprising the minimum and maximum illuminance values Imin,3, Imax,3 of the illuminance range P3 to the sensor 8 via the input interface IN.

In the embodiment described here, each of the response durations $\Delta t_{B1}$, $\Delta t_{Dn}$ comprises the temporization duration $\Delta t_{tempo,B1}$, $\Delta t_{tempo,Dn}$ and the total transition duration $\Delta t_{trans}[\tau v2,\tau v1]$, $\Delta t_{trans}[\tau v(t1),\tau v3]$ of the transition function used, respectively.

In the embodiment described here, the first temporization duration $\Delta t_{tempo,Dn}$ is different from the second temporization duration $\Delta t_{tempo,B1}$ and depends of the sign of a difference between the initial transmission value and the target transmission value. In other words, if the target transmission value is greater than the initial transmission value, for example when τv,1 is greater than τv(t0)=τv,2, a temporization duration $\Delta t_{tempo,B1}$ is applied and if the target transmission value is lower than the initial transmission value, for example when τv,3 is lower than τv(t1), a temporization duration $\Delta t_{tempo,Dn}$ is applied According to another embodiment, the first and second temporization durations may be determined as a function of the illuminance measured outside the current illuminance range used for detection shortly after the illuminance has changed.

Preferably, the total transition duration $\Delta t_{trans}$, here $\Delta t_{trans}[\tau v2,\tau v1]$ and $\Delta t_{trans}[\tau v(t1),\tau v3]$, are chosen greater than or equal to 300 milliseconds and lower than or equal to 10 500 milliseconds. Those values have been tested on wearers of eyeglasses comprising variable transmission devices and wearers acknowledged an improved visual comfort.

In an alternative, the first and second temporization durations $\Delta t_{tempo,Dn}$, $\Delta t_{tempo,B1}$ may be equal to each other or equal to zero. When the first and second temporization durations $\Delta t_{tempo,Dn}$, $\Delta t_{tempo,B1}$ are equal to zero, the response duration corresponds to the total transition duration $\Delta t_{trans}$ of the transition function $f\tau_V(t_i),\tau_{V,target}(t)$.

As described before, the value of the total transition duration $\Delta t_{trans}$ is dependent of the initial transmission value and of the target transmission value. The value of the total transition duration $\Delta t_{trans}$ may depend on the absolute value of the difference between the initial transmission value and the target transmission value and/or the value of the total transition duration may depend on the sign of the difference between the initial transmission value and the target transmission value.

According to an embodiment, the value of the total transition duration may be different depending on whether the transmission is being increased or lowered. When the transmission lowers, i.e. when the variable transmission optics darkens, a total transition duration $\Delta t_{trans,Dn}$ may be applied. When the transmission increases, i.e. when the variable transmission optics clears, a total transition duration $\Delta t_{trans,B1}$ may be applied.

According to a variant, the values of the total transition durations $\Delta t_{trans,Dn}$, $\Delta t_{trans,B1}$ are constant and $\Delta t_{trans,Dn}$ is different from $\Delta t_{trans,B1}$. The value of the total transition duration to choose only depends on the sign of the difference between the initial transmission value and the target transmission value.

According to another variant, the total transition durations $\Delta t_{trans,Dn}$, $\Delta t_{trans,B1}$ may vary. The value of the total transition duration to choose depends on both the sign and the absolute value of the difference between the initial transmission value and the target transmission value. Accordingly, a different transition duration $\Delta t_{trans,B1}$ may be used for example when the optical transmission increases from τv,3 to τv,2 and from τv,3 to τv,1. Furthermore, the total transition duration $\Delta t_{trans,Dn}$ used for lowering the transmission, for example from τv,2 to τv,3, is different from the total transition duration $\Delta t_{trans,B1}$ used for increasing the transmission from τv,3 to τv,2.

As represented in FIG. 3C, the control unit 5 may send a plurality of command signals representative of transmission values to be reached by the electrochromic or liquid crystal optics. The plurality of command signals may comprise a plurality of command signals representative of levels of intermediate transmission values comprised between the initial transmission value $\tau_V(t_i)=\tau v,2$ and the target transmission value $T_{V,target}=\tau v,1$ for example, and may comprise a command signal representative of the target transmission value $\tau_{V,target}$ in the case of a linear transition function. Each level of intermediate transmission values may have a different duration that is controlled by the control unit 5, and may preferably not be perceptible to the wearer, i.e. the levels of intermediate transmission value vary with a frequency less than the persistence of vision, typically of the order of 30 Hz. As may be seen in FIG. 3C, the intermediate transition values vary substantially according to equation (1).

The transition function $f\tau_V(t_i),\tau_{V,target}(t)$ may be any transition function defined such that:

$$\begin{cases} f_{\tau_V(t_i),\tau_{V,target}}(0) = 0 \\ \lim_{t \to +\infty} f_{\tau_V(t_i),\tau_{V,target}}(t) = \tau_{V,target} - \tau_V(t_i) \end{cases}$$

According to an embodiment, the transition function $f\tau_V(t_i),\tau_{V,target}(t)$ may be an exponential function defined as:

$$f_{\tau_V(t_i),\tau_{V,target}}(t) = [\tau_{V,target} - \tau_V(t_i)]\left[1 - \exp\left(-\frac{t}{T_{\tau_V(t_i),\tau_{V,target}}}\right)\right] \quad (2)$$

wherein $\tau_V(t_i)$ is the initial transmission value at a time $t=t_i$,
$\tau_{V,target}$ is the target transmission value,
t is the current time, and $T\tau_V(t_i), t_{V,target}$ is a time constant of the transition function.

The time constant $T\tau_V(t_i), \tau_{V,target}$ of the exponential transition function may be determined as a function of the initial transmission value and the target transmission value. The total transition duration $\Delta t_{trans}$ of the transition function $f\tau_V(t_i), \tau_{V,target}(t)$, when the transition function is an exponential function, is then equal to three times the time constant $T\tau_V(t_i), \tau_{V,target}$.

According to an embodiment, the time constant and thus the total transition duration may be dependent of the sign of a difference between the initial transmission value $\tau_V(t_i)$ and the target transmission value $\tau_{V,target}$ such that:

when $\text{sign}(\tau_V(t_i) - \tau_{V,target}) = 1$, $T\tau_V(t_i)\tau_{V,target} = T_{Dn}$, and when $\text{sign}(\tau_V(t_i) - \tau_{V,target}) = -1$, $T\tau_V(t_i), \tau_{V,target} = T_{B1}$.

$T_{Dn}$ is thus different from $t_{B1}$ such that the exponential transition function has a different time constant $T\tau_V(t_i)$, $\tau_{V,target}$ depending on whether the transmission is increased or lowered, independently of the initial and target transmission values considered.

Further, $T_{Dn}$ and $T_{B1}$ may be chosen preferably greater than 100 milliseconds and less than 3500 milliseconds. Those values have been tested on wearers of eyeglasses comprising variable transmission devices and wearers acknowledged an improved visual comfort. According to another embodiment, different transition functions may be used, depending on whether the optical transmission value is lowered or increased, i.e. depending on the sign of the difference between the initial transmission value and the target transmission value.

Figure 4:
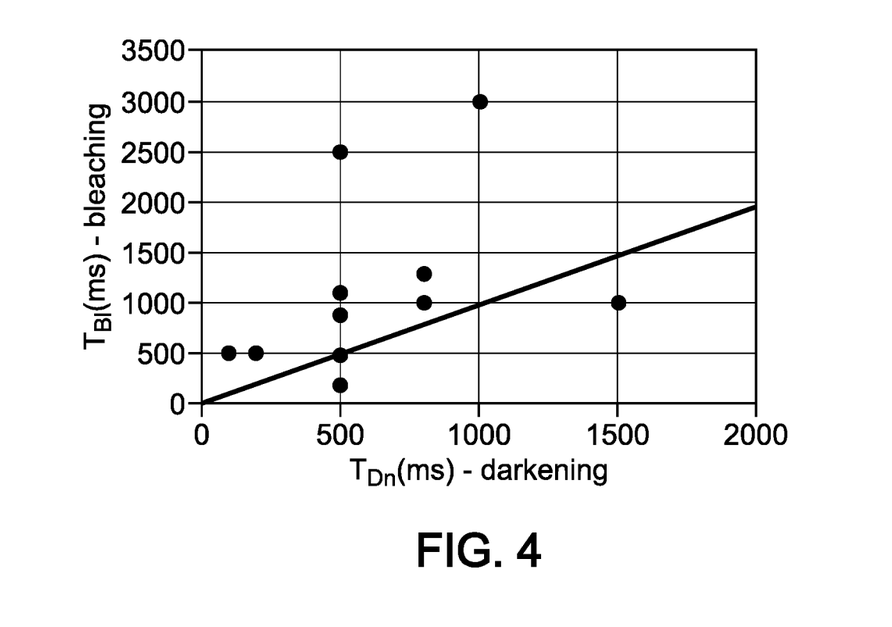
FIG. 4 illustrates examples of parameters relative to the first and second response durations preferred by a population of users.

FIG. 4 shows the results of an experiment conducted on the wearers of an eyewear comprising liquid crystal lenses. Using the remote configuring unit, the control unit 5 was configured with first and second exponential transition functions with different values for the time constant $T_{Dn}$ and $T_{B1}$ which were set by a population of users. FIG. 4 shows a graph of the values ($T_{Dn}$ and $T_{B1}$) which provided the best visual comfort to each user. As can be read from the graph, the best visual comfort of the users may be obtained for different values of $T_{Dn}$, $T_{B1}$, each couple ($T_{Dn}$, $T_{B1}$) being different from one user to the other. It also results that, for some wearers or for a particular group of wearers, the visual comfort is increased when the response duration (dependent of $T_{B1}$) applied when the transmission of the eyewear is increased, i.e. when the variable transmission optics bleaches, is different from the response duration (dependent of $T_{Dn}$) applied when the transmission of the eyewear decreases, i.e. when the variable transmission optics darkens. As can be seen on FIG. 4, the couples ($T_{Dn}$, $T_{B1}$) are not situated on the linear function having a slope of 1.

One may appreciate that the visual comfort of the user may also be improved by varying the total transition duration of the transition function used and/or varying the temporization duration.

Thus, the remote configuring unit may be used to test different total transition durations and/or different temporization durations and/or different transition functions on a wearer or on different groups of wearers. Depending on the results of the tests, particular transition functions and/or particular temporization durations and/or particular total transition durations may be proposed to the wearer according to its preferences or to the preferences of a group of wearers which has been tested.

In the embodiment described here, the variable transmission optics is an electrochromic or a liquid crystal lens and the response duration is controlled in automatic mode by controlling the optical transmission of the variable transmission optics.

In an alternative, the control unit may be controlled in manual mode. Using the control element 9, the user may set the target value of transmission to be reached by the variable transmission optics 4a, 4b. The parameters that may be used to set a particular response duration for reaching the target value of transmission may be previously set using the remote control unit, which may optionally comprise a dedicated user interface.

In another embodiment, the variable transmission optics may be a photochromic lens. In that case, the target transmission value corresponds to a stationary value of transmission reached by the optics once the photochromic reaction following the change in the luminous environment is completed.

The response duration may be controlled by controlling the velocity at which the optical transmission varies by heating the photochromic lens.

Photochromic lenses or optics comprise photochromic compounds embedded in a polymer layer or within the lens or optics. The change of optical transmission of the lens or optics results in a chemical reaction that is initiated by light absorbed by the photochromic compounds. The velocity at which the optical transmission varies is dependent on the composition and concentration of the photochromic compounds. The velocity at which the optical transmission of a photochromic lens or optics varies may also be controlled by heating the photochromic compounds embedded in a polymer layer or within the lens or optics as disclosed in document WO2014/071179 for example.

It is thus possible to control the response duration of a photochromic lens or optics by applying a predetermined temperature during a predetermined duration. For that purpose, the photochromic lenses or optics may comprise a transparent heater placed in contact with the polymer layer comprising the photochromic compounds or in contact with the photochromic lens or optics. The transparent heater may be a layer of conductive material having a given resistivity and transmitting enough UV light to cause the photochromic element to darken or lighten up and transmitting enough visible light for the wearer to see through the lens in the absence of darkening. The transparent heater comprises two electrodes which are connected to a voltage source. Thus, when a current flows through the layer of conductive material forming the transparent heater, the material in the vicinity comprising the photochromic compounds is heated as a consequence of the Joule effect. An example of a suitable conductive material is indium tin oxide (ITO). The photochromic compounds may also be embedded within a conductive polymer and/or conductive polymer with conductive nanoparticles. Two conductive electrodes having low resistivity are thus placed on both sides of the conductive polymer comprising the photochromic compounds and optionally the conductive nanoparticles. In that case, the heat is produced directly by the Joules effect into said layer.

In the case of a photochromic lens, the response duration of the variable transmission is controlled by applying a predetermined temperature during a predetermined duration. The response duration may be determined as a function of the initial transmission value and the target transmission value. The initial transmission value may be measured by a sensor configured to measure the transmission value of the lens or optics. The target transmission value may be inferred from a measurement of the illuminance measured by the ambient light sensor. Depending on the value of the difference between the initial transmission value and the target transmission value, the response duration, and more particularly the temperature Temp and the duration of heating $\Delta t_{heat}$, may be determined. The temperature Temp and the heating duration $\Delta t_{heat}$ is set by the controller, and more particularly by the command signals sent by the control unit to the voltage driver 7. The temperature Temp intended to be applied to the photochromic lens is set by applying a corresponding voltage between the two electrodes of the transparent heater.

According to another embodiment, the value of the response duration, and more particularly the temperature and the duration of heating, are determined as a function of the sign of the difference between the initial transmission value and the target transmission value. In that case, the value of the response duration is only determined depending on whether the optical transmission of the photochromic is being lowered or increased, i.e. depending on whether the photochromic optics darkens or clears.

Thus, a first temperature $Temp_{B1}$ and a first heating duration $\Delta t_{heat,B1}$ is set by the controller if the target transmission value is lower than the initial transmission value and a second temperature $Temp_{Dn}$ and a second heating duration $\Delta t_{heat,Dn}$ is set by the controller if the target transmission value is greater than the initial transmission value. The duration of heating may be fine tuned by controlling the current transmission of lens or optics using a closed control loop. As described previously, an ambient light sensor may be used to detect a change of illuminance of the luminous environment surrounding the variable transmission optics according to the one of methods described previously.

Also as described previously, according to another embodiment, a temporization may be applied before the sensor 8 indicates a change in illuminance to the processor PROC of the control unit 5.

According to other embodiments, the variable transmission device may be comprised in other types of eyewear such as sunglasses, ski helmets or virtual reality glasses and more generally head mounted displays. The variable transmission optics may thus be formed of one or two ophthalmic lenses depending on the type of eyewear which may also not be specifically designed to correct an ametropia of the wearer if a correction is not necessary. The variable transmission device may also be incorporated into building windows, doors or walls. In that case, the variable transmission optics are formed of an organic or mineral glass plane substrate mounted on a rectangular frame.

The invention claimed is:

1. A variable optical transmission device comprising:
a variable transmission optics configured to vary an optical transmission between an initial transmission value and a target transmission value; and
circuitry configured to control a transmission parameter of the variable transmission optics, wherein the circuitry is configured to control a response duration of the variable transmission optics as a function of the initial transmission value and the target transmission value, wherein
the circuitry is configured to control the response duration depending on a sign of a difference between the initial transmission value and the target transmission value, and
the circuitry is configured to control:
a first response duration for lowering an optical transmission of the variable transmission optics from an initial transmission value to a target transmission value, and
a second response duration for increasing the optical transmission from the initial transmission value to the target transmission value, the first response duration being different from the second response duration.

2. The variable optical transmission device of claim 1, wherein the response duration is chosen according to preferences of a wearer or of a group of wearers.

3. The variable optical transmission device of claim 1, further comprising:
an ambient light sensor configured to measure periodically illuminance and to detect a change in illuminance, wherein:
the change in illuminance is detected when the illuminance measured is different from a reference illuminance during a predetermined temporization duration,
the circuitry is configured to control, upon detection of the change in illuminance after the predetermined temporization duration, a transmission parameter of the variable transmission optics, and
the response duration comprises the predetermined temporization duration.

4. The variable optical transmission device of claim 1, wherein the variable transmission optics is chosen between one of an electrochromic optics and a liquid crystal optics, and the transmission parameter of the variable transmission optics is an optical transmission of the variable transmission optics.

5. The variable optical transmission device of claim 4, wherein the circuitry is configured to control an optical transmission value such that the optical transmission value varies according to:

$$\tau_V(t_i+t) = \tau_V(t_i) + f_{\tau_V(t_i),\tau_{V,target}}(t),$$

wherein $\tau_V(t_i)$ is the initial transmission value at a time $t=t_i$,
$\tau_V(t_i+t)$ is a current transmission value at a time $t_i+t$, and $f_{\tau_V(t_i),\tau_{V,target}}(t)$ is a transition function depending on the initial transmission value $\tau_V(t_i)$ and the target transmission value $\tau_{V,target}$ defined such that:

$$\begin{cases} f_{\tau_V(t_i),\tau_{V,target}}(0) = 0 \\ \lim_{t \to +\infty} f_{\tau_V(t_i),\tau_{V,target}}(t) = \tau_{V,target} - \tau_V(t_i) \end{cases}$$

in absence of a detection of a change of illuminance after $t=t_i$,
the transition function having a total transition duration defined by a time interval during which the transition function reaches a transmission value of $0.95(\tau_{V,target} - \tau_V(t_i))$, and
wherein the response duration comprises the total transition duration.

6. The variable optical transmission device of claim 5, wherein the total transition duration is chosen greater than or equal to 300 milliseconds and lower than or equal to 10 500 milliseconds.

7. The variable optical transmission device of claim 5, wherein
when the optical transmission lowers from a first initial transmission value to a first target transmission value, the optical transmission varies according to a first transition function having a first total transition duration,
when the optical transmission increases from a second initial transmission value to a second target transmission value, the optical transmission varies according to a second transition function having a second total transition duration, and the second total transition duration is different from the first total transition duration.

8. The variable optical transmission device of claim 7, wherein the first initial transmission value is equal to the second target transmission value and the first target transmission value is equal to the second initial transmission value.

9. The variable optical transmission device of claim 1, wherein the variable transmission optics is a photochromic optics, the variable optical transmission device further comprises a transparent heating element, the circuitry is configured to control the response duration of the photochromic optics by setting a predetermined temperature during a predetermined heating duration, the predetermined temperature and heating duration are determined as a function of the initial transmission value and the target transmission value.

10. The variable optical transmission device of claim 1, further comprising:

a remote device configured to send to the circuitry at least a first response duration and a second response duration, the remote device being intended to be used for testing different first response duration, second response duration on a wearer of the variable optical transmission device or for configuring the variable optical transmission device with a first response duration and a second response duration according to preferences of the wearer.

11. A method for controlling a variable optical transmission device, comprising:

controlling a transmission parameter of a variable transmission optics of the variable optical transmission device, wherein the method further comprises:

controlling a response duration of the variable transmission optics as a function of an initial transmission value and a target transmission value, and the method further comprises:

controlling the response duration depending on a sign of a difference between the initial transmission value and the target transmission value, comprising:

controlling a first response duration for lowering an optical transmission of the variable transmission optics from an initial transmission value to a target transmission value, and controlling a second response duration for increasing the optical transmission from an initial transmission value to a target transmission value, the first response duration being different from the second response duration.

12. The method for controlling a variable optical transmission device of claim 11, wherein the response duration is chosen according to preferences of a wearer.

13. A non-transitory computer-readable medium comprising a computer program stored thereon and including instructions for implementation of the method of claim 11 when the instructions are executed by a processor.

14. A variable optical transmission device comprising:

variable transmission optics means for varying an optical transmission between an initial transmission value and a target transmission value; and control means for controlling a transmission parameter of the variable transmission optics means, wherein the control means control a response duration of the variable transmission optics means as a function of the initial transmission value and the target transmission value, wherein the control means control the response duration depending on a sign of a difference between the initial transmission value and the target transmission value, and the control means control:

a first response duration for lowering an optical transmission of the variable transmission optics means from an initial transmission value to a target transmission value, and a second response duration for increasing the optical transmission from the initial transmission value to the target transmission value, the first response duration being different from the second response duration.

\* \* \* \* \*